United States Patent
Kikuta et al.

(10) Patent No.: US 7,279,540 B2
(45) Date of Patent: Oct. 9, 2007

(54) ION-POLYMER GEL ELECTROLYTE AND ITS PRECURSOR COMPOSITION

(75) Inventors: Manabu Kikuta, Kyotanabe (JP); Akiyoshi Hatakeyama, Ritto (JP)

(73) Assignee: Dai-ichi Kogyo Seiyaku Co., Ltd., Kyoto (JP)

( * ) Notice: Subject to any disclaimer, the term of this patent is extended or adjusted under 35 U.S.C. 154(b) by 140 days.

(21) Appl. No.: 11/184,263

(22) Filed: Jul. 18, 2005

(65) Prior Publication Data

US 2006/0020093 A1    Jan. 26, 2006

(30) Foreign Application Priority Data

Jul. 20, 2004    (JP)    ............... 2004-212276

(51) Int. Cl.
 *C08F 12/28*    (2006.01)
(52) U.S. Cl. ...................... 526/310; 526/335
(58) Field of Classification Search ............... 526/310, 526/335
 See application file for complete search history.

(56) References Cited

U.S. PATENT DOCUMENTS

2006/0120021 A1*  6/2006 Banno et al. ............... 361/502

FOREIGN PATENT DOCUMENTS

JP    10-265673    10/1998

WO    WO 2004027789 A1 *   4/2004

* cited by examiner

*Primary Examiner*—Robert D. Harlan
(74) *Attorney, Agent, or Firm*—Jordan and Hamburg LLP

(57) ABSTRACT

A precursor composition capable to form a solid-state electrolyte having good ion conductivity and high heat-resistance, by simple curing procedure, comprising; (A) a polymerizable ion pair compound represented by formula I, (B) a cross-linker having two or more unsaturated groups co-polymerizable with the polymerizable ion pair compound (A), and (C) non-polymerizable ion pair compound. Each of R1, R2, R3, R4, R5 and R6 represents hydrogen atom, alkyl or aryl group having 1-12 carbon atoms; and each of R7 and R8 represents alkyl or aryl group having 1-12 carbon atoms. X designates either of halogen atom, $AlCl_4^-$, $PF_6^-$, $BF_4^-$, bis (oxalato) borate anion, $R_{f1}SO_3^-$, $(NC)_2N^-$, $(R_{f2}Y)_2N^-$, $(R_{f2}Y)_3C^-$, and $(R_{f2}Y)_2C^-Q$, where $R_{f1}$ designates perfluoro alkyl or aryl group having 1-8 carbon atoms; each $R_{f2}$ designates fluorine atom, perfluoro alkyl or aryl group having 1-8 carbon atoms; Y designates $—SO_2—$ or $—PO—R_{f2}$; and Q designates $—H$ or $—CO—R_{f2}$

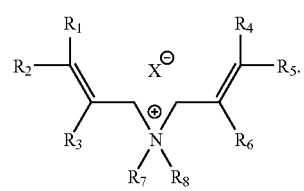

I

8 Claims, No Drawings

ION-POLYMER GEL ELECTROLYTE AND ITS PRECURSOR COMPOSITION

FIELD OF THE INVENTION

This invention relates to a polymer-gel electrolyte forming conductor for protons and ions, and to a precursor composition for producing thereof. Particularly, the invention relates to a polymer-gel electrolyte and its precursor composition that are preferably applicable to electrochemical devices utilizing electrochemical reaction, such as battery, capacitor, fuel cell, solar battery and electrochemical sensor. The polymer-gel electrolyte is also applicable to solid-state catalyst for chemical reaction, and to antistatic agent or electrostatic shielding material.

BACKGROUND ART

In order to enhance performances or safety of lithium battery, capacitor or the like, numerous investigations has been made for utilizing gel or polymer electrolyte in place of liquid-state electrolyte that has been conventionally used. As for polymer electrolytes, investigations have been made on alkylene oxides added with electrolyte salts such as lithium perchlorate, lithium methanesulfonate, and lithium bis(trifluoro methane sulfonyl imide). Nevertheless, satisfactory ion conductivity at room temperature or at 25° C. has not been achieved yet as hampered by thermo-dynamical mobility of the alkylene oxide polymer chains. Moreover, the alkylene oxide polymers are defective in thermal stability and start to decompose at a temperature of 180° C. or more.

Meanwhile, ionic liquid that has recently attracted attentions exhibit good ion conductivity. Nevertheless, if the ionic liquid is highly viscose, the ion conductivity deteriorates. Moreover, when the ionic liquid is converted to solid state by being combined with polymer compounds, mobility of the ions is hampered by constrictions on motion of macromolecular chains; thus density of the ions and thereby the ion conductivity are further decreased. Please see JP-1998(H10)-265673A.

In view of the above, it is aimed to provide precursor compositions capable to form a solid-state electrolyte having good ion conductivity and high heat-resistance by simple curing procedure such as casting into a mould or onto a surface, as well as to provide gel electrolyte obtainable from the precursor compositions.

BRIEF SUMMARY OF THE INVENTION

Invention-wise precursor composition for the ion-polymer gel electrolyte is comprised of: (A) ion pair compound polymerizable as to form a polymer, (B) cross-linker having two or more unsaturated groups co-polymerizable with the ion pair compound (A), and (C) non-polymerizable ion pair compound. In a preferred embodiment, the precursor composition further contain polymerization initiator, which is one or any combination selected from: (D) photo polymerization initiator, (E) thermal polymerization initiator, (F) redox (reduction-oxidation) polymerization initiator and the like.

By the invention-wise precursor composition, casting into a mould, impregnation, and/or casting onto a surface is easily made; and gel electrolyte having good ion conductivity is easily obtainable by a simple procedure such as ultraviolet irradiation and heating. The gel electrolyte may be placed between electrodes or mixed with electrode material, and is applicable in an electrochemical device utilizing electro chemical reaction, such as battery, capacitor, fuel cell, solar battery and electrochemical sensor.

DETAILED DESCRIPTION OF THE INVENTION

The polymerizable ion pair compound (A) is expressed by following chemical formula I, and is exemplified by ion pairs formed of at least one selected from a group of cations listed below and at least one selected from a group of anions listed below.

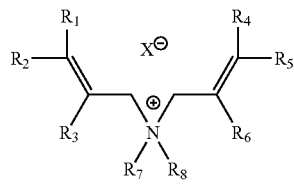

I

In above formula, each of R1, R2, R3, R4, R5 and R6 independently represents hydrogen atom, alkyl or aryl group having 1-12 carbon atoms; and each of R7 and R8 independently represents alkyl or aryl group having 1-12 carbon atoms.

Cations for (A): diallyl dimethyl ammonium, diallyl methyl-ethyl ammonium, diallyl diethyl ammonium, diallyl dipropyl ammonium, diallyl methyl-hexyl ammonium, diallyl methyl-octyl ammonium, diallyl methyl-laurylammonium, diallyl methyl-benzyl ammonium, allyl-methallyl dimethyl ammonium, allyl-methallyl methyl-ethyl ammonium, allyl-methallyl diethyl ammonium, allyl-methallyl dipropyl ammonium, allyl-methallyl methyl-hexyl ammonium, allyl-methallyl methyl-octyl ammonium, allyl-methallyl methyl-lauryl ammonium, dimethallyl dimethyl ammonium, dimethallyl methyl-ethyl ammonium, dimethallyl diethyl ammonium, dimethallyl dipropyl ammonium, dimethallyl methyl-hexyl ammonium, dimethallyl methyl-octyl ammonium, dimethallylmethyl-lauryl ammonium, and the like. Preferable cations among them are; diallyl dimethyl ammonium, diallyl methyl-ethyl ammonium, dimethallyl dimethyl ammonium, diallyl methyl-propyl ammonium, diallylmethyl-hexyl ammonium. Diallyl dimethyl ammonium is especially preferred in view of production cost.

Anions for (A): $Cl^-$, $Br^-$, $I^-$, $AlCl_4^-$, $PF_6^-$, $BF_4^-$, bis (oxalato) borate anion, $R_{f1}SO_3^-$, $(NC)_2N^-$, $(R_{f2}Y)_2N^-$, $(R_{f2}Y)_3C^-$, $^{and}$ $(R_{f2}Y)_2C^-Q$. $R_{f1}$ designates perfluoro alkyl or aryl group having 1-8 carbon atoms; each $R_{f2}$ designates independently fluorine atom, perfluoro alkyl or aryl group having 1-8 carbon atoms; Y designates —$SO_2$— or —PO—$R_{f2}$; and Q designates —H or —CO—$R_{f2}$. Preferable anion among them are $R_{f1}SO_3^-$, $(NC)_2N^-$, $(R_{f2}Y)_2N^-$, $(R_{f2}Y)_3C^-$, and $(R_{f2}Y)_2C^-Q$. Especially preferable anions are $(CF_3SO_2)_2N^-$, $(FSO_2)_2N^-$ and $(NC)_2N^-$.

Such polymerizable ion pair compound (A), or polymerizable ionic liquid, presumably forms 5-member aliphatic ring ammonium and/or 6-member aliphatic ring ammonium as a result of cyclopolymerization on course of the polymerization. According to investigations made on the ionic liquid, the 5-member and/or 6-member aliphatic ring ammonium is considered to be preferable. The polymerizable ion pair compound (A) is included in the precursor composition preferably at no less than 5 wt %, more preferably at no less than 20 wt %.

As for the cross-linker (B) or monomer having two or more unsaturated groups co-polymerizable with the ion pair compound (A), the unsaturated groups are preferably selected from a group consisting of vinyl, allyl, methallyl, acryl and methacryl groups; and number of the unsaturated groups is preferably two or three. The cross-linker (B) is exemplified by: ion pairs formed of at least one selected from a group of cations listed below and at least one selected from a group of anions listed below; and/or at least one of non-ionic compounds listed bellow.

Cations for (B): triallyl ammine, triallyl-methyl ammonium, triallyl-ethyl ammonium, triallyl-propyl ammonium, triallyl-butyl ammonium, triallyl-hexyl ammonium, triallyl-benzyl ammonium, tetraallyl ammonium, diallyl methallyl-methyl ammonium, allyl dimethallyl-methyl ammonium and trimethallyl methyl ammonium. Preferable cations among them are; triallyl-methyl ammonium, triallyl-ethyl ammonium, triallyl-propyl ammonium, triallyl-butyl ammonium and triallyl-hexyl ammonium.

Anions for (B): Cl$^-$, Br$^-$, I$^-$, AlCl$_4^-$, PF$_6^-$, BF$_4^-$, bis (oxalato) borate anion, R$_{f1}$SO$_3^-$, (NC)$_2$N$^-$, (R$_{f2}$Y)$_2$N$^-$, (R$_{f2}$Y)$_3$C$^-$, and (R$_{f2}$Y)$_2$C$^-$Q. R$_{f1}$ designates perfluoro alkyl or aryl group having 1-8 carbon atoms; each R$_{f2}$ designates independently fluorine atom, perfluoro alkyl or aryl group having 1-8 carbon atoms; Y designates —SO$_2$— or —PO—R$_{f2}$; and Q designates —H or —CO—R$_{f2}$. Preferable anion among them are R$_{f1}$SO$_3^-$, (NC)$_2$N$^-$, (R$_{f2}$Y)$_2$N$^-$, (R$_{f2}$Y)$_3$C$^-$, and (R$_{f2}$Y)$_2$C$^-$Q. Especially preferable anions are (CF$_3$SO$_2$)$_2$N$^-$, (FSO$_2$)$_2$N$^-$ and (NC)$_2$N$^-$.

Non-ionic compounds for (B): monomers having two unsaturated groups that are poor in cyclopolymerizability, such as diallyl phthalate, diallyl terephthalate, ethylene glycol diacrylate and ethylene glycol dimethacrylate; and monomers having three or more unsaturated groups such as triallyl isocyanurate, trimethylol propane triallyl ether and neopentyl glycol tetraallyl ether. Among them, preferable monomers are diallyl phthalate, diallyl terephthalate, triallyl isocyanurate, trimethylol propane triallyl ether. That is, compounds each having allyl groups and nitrogen atom and/or oxygen atom are preferable in view of compatibility with the other component in the composition and in view of cost efficiency. The non-ionic compound(s) as the crosslinker(s) is included in the precursor composition preferably in a range of from 1 wt % to 50 wt %.

The non-polymerizable ion pair compound (C) is exemplified by ion pairs formed of at least one selected from a group of cations listed below and at least one selected from a group of anions listed below.

Cations for (C): proton, alkaline metal ions, alkaline earth metal ions, zinc ion, cadmium ion, mercury ion, and other transition metal ions; rare earth ions, diazonium ion, phosphonium ion, sulfonium ion and oxonium ion; and organic cations represented by general formula of NuR$^+$, in which Nu designates ammonia, alkyl amine, pyridine, imidazole, amidine, guanidine or alkaloid, while R$^+$ designates alkyl or oxyalkyl group having 1-20 carbon atoms, or aryl group having 6-30 carbon atoms. More preferable cations are: lithium or sodium ions and/or imidazoliums represented by following Formula II and/or quaternary ammonium represented by following Formula III. Among them, methyl ethyl imidazolium, methyl propyl imidazolium, methyl hexyl imidazolium, dimethyl dipropyl ammonium and trimethyl butyl ammonium are especially preferred in view of cost efficiency.

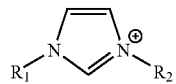

Each of R1 and R2 designates alkyl, aryl or alkoxy group having 1-8 carbon atoms.

Each of R1, R2, R3 and R4 designates, independently, alkyl, aryl or alkoxy group having 1-8 carbon atoms.

Anions for (C): Cl$^-$, Br$^-$, I$^-$, AlCl$_4^-$, PF$_6^-$, BF$_4^-$, bis (oxalato) borate anion, R$_{f1}$SO$_3^-$, (NC)$_2$N$^-$, (R$_{f2}$Y)$_2$N$^-$, (R$_{f2}$Y)$_3$C$^-$, and (R$_{f2}$Y)$_2$C$^-$Q. R$_{f1}$ designates perfluoro alkyl or aryl group having 1-8 carbon atoms; each R$_{f2}$ designates independently fluorine atom, perfluoro alkyl or aryl group having 1-8 carbon atoms; Y designates —SO$_2$— or —PO—R$_{f2}$; and Q designates —H or —CO—R$_{f2}$. Preferable anion among them are R$_{f1}$SO$_3^-$, (NC)$_2$N$^-$, (R$_{f2}$Y)$_2$N$^-$, (R$_{f2}$Y)$_3$C$^-$, and (R$_{f2}$Y)$_2$C$^-$Q. Especially preferable anions are (CF$_3$SO$_2$)$_2$N$^-$, (FSO$_2$)$_2$N$^-$ and (NC)$_2$N$^-$. The non-polymerizable ion pair compound (C) is included in the precursor composition preferably at no more than 95 wt %, and more preferably at no more than 80 wt %, although content range of the compound (C) is not particularly limited. If the content of the compound (C) exceeds the 95 wt %, formation of a gel structure is not achievable.

The photo polymerization initiator (D) is exemplified by at least one selected from: 2,2-dimethoxy-2-phenyl acetophenone, 1-hydoroxy cyclohexyl phenyl ketone, benzophenone, 2-methyl [4-(metylthio)phenyl]-2-morpholino-1-propanone, phenyl bis(2,4,6-trimethyl benzoyl)-phosphine oxides, bis(2, 6-dimethoxy benzoyl) -2,4, 4-trimethyl pentyl phosphine oxide, olgo[2-hydroxy-2-methyl-1-[4-(1-methylvinyl) phenyl] propanone] and the like, while this exemplification is not meant to be limitative. Content of the photo polymerization initiator (D) in the precursor composition is preferably in a range from 0.05 wt % to 5 wt %. When the content is less than the 0.05 wt %, formation of a gel structure is not achievable; and content exceeding the 5 wt % deteriorates safety and is disadvantageous in cost efficiency.

The thermal polymerization initiator (E) is exemplified by at least one selected from: methyl ethyl ketone peroxide, acetyl acetone peroxide and other ketone peroxides; t-butyl hydro peroxide and other hydro peroxides; isobutyryl peroxide and other diacyl peroxides; dicumyl peroxide, dibutyl cumyl peroxide and other dialkyl peroxides; t-butyl peroxy pivalate, t-butyl peroxy isobutylate and other alkyl peroxy esters; bis(4-t-butyl cyclohexyl) peroxo dicarbonate and other peroxocarbonates and the like, while this exemplification is not meant to be limitative. Content of the photo polymerization initiator (E) in the precursor composition is preferably in a range from 0.05 wt % to 5 wt %. When the content is less than the 0.05 wt %, formation of a gel structure is not achievable; and content exceeding the 5 wt % deteriorates safety and is disadvantageous in cost efficiency.

The polymerization initiators mentioned hereto may be adopted separately one by one or in combination of two or more. The precursor composition may be added with heat stabilizer, antioxidant, light stabilizer, oxidation-reduction substance, oxidizing and reducing agents, inorganic fillers or the like; and may be added with compatible solvents so far as shape of gel electrolyte product is retained after curing. The precursor composition may be further added with polymeraizable monomers in accordance with specific purpose such as improvements in mechanical strength or flexibility of the gel electrolyte. Such monomer able to be added is exemplified by polar monomers having one unsaturated group such as; vinyl pyrrolidone, vinyl acetate, allyl acetate, vinyl formamide, and acrylic acid esters such as hydroxyl ethyl acrylate; while these exemplification is not meant to be limitative.

Method of preparing the precursor composition is exemplified by following, while the exemplification is not meant to be limitative. A reaction vessel equipped with agitator is charged with the polymerizable ion pair compound (A) as well as the cross-linker (B) having two or more unsaturated groups co-polymerizable therewith, followed by mixing them. Then, non-polymerizable ion pair compound (C) is added to the mixture. The photo polymerization initiator (D) or the thermal polymerization initiator (E) maybe further added to be dissolved if necessary or appropriate in accordance with occasion. In otherwise, the precursor composition may be prepared in following way. Methanol, ethanol, propanol, acetonitrile, or other compatible solvent is used; and the polymerizable ion pair compound (A), the cross-linker (B), the non-polymerizable ion pair compound (C) and polymerization initiator are added to the solvent one by one, or at any arbitrary time. After mixing and dissolving, the solvent is removed by vaporization. In order to improve storage stability or to prolong shelf life, the polymerization initiator may be omitted when preparing the precursor composition, and as to be added just before forming of the gel electrolyte.

The method of preparing the gel electrolyte is exemplified by followings, while the exemplification is not meant to be limitative. The precursor composition is poured into a casting mold and then cured by UV irradiation or heating in accordance with species of the polymerization initiator. In otherwise, the precursor composition is poured or applied onto a film and then cured in same manner as above to form a film-shaped gel electrolyte. Thus obtained ion-polymer-gel electrolyte has satisfactory ion conductivity and shape retainability with no fluidity. This is presumably because the gel electrolyte ionic polymer has unfixed or movable anionic groups on an ionic polymer matrix having decently cyclized ammonium groups and has both of cation and anion components that are formed of free ion pair compound and have excellent low-temperature performance.

EXAMPLE 1

Diallyl dimethyl ammonium-$(FSO_2)_2N^-$ (45 weight part), propyl methyl imidazolium-$(FSO_2)_2N^-$ (45 weight part), triallyl-methyl ammonium-$(CF_3SO_2)_2N^-$ (9.5 weight part) and Irgacure 651 (Chiba speciality chemicals, 0.5 weight part) were mixed with each other. Thus obtained mixture was applied on a polypropylene film by thickness of 0.5 mm. Then, the applied mixture was covered by a protection film formed of polypropylene, and irradiated with ultraviolet light of 15 mW/cm$^2$ for 10 minutes, as to obtain a gel electrolyte film. Ion conductivity of the film was 10.2 mS/cm when measured at 25° C. by impedance analyzer. On thermogravity analysis, thermal reduction started at about 290° C.

EXAMPLE 2

Diallyl dimethyl ammonium-$(CF_3SO_2)_2N^-$ (45 weight part), ethyl methyl imidazolium-$(CF_3SO_2)_2N^-$, (45 weight part), triallyl-isocyanurate (9.5 weight part) and Esacure KTO46 (Lamberti s.p.a., 0.5 weight part) were mixed with each other to form a uniform mixture. Thus obtained mixture was applied on a polypropylene film or a base, by thickness of 0.5 mm. Then, the applied mixture was covered by a protection film formed of polypropylene, and irradiated with ultra violet light of 15 mW/cm$^2$ for 10 minutes. A gel electrolyte film thus obtained was homogenous, non-flowable, and self-sustainable when picked up by forceps. The film was cut in a disk at diameter of 1 cm; and ion conductivity of thus cut film was 13.1 mS/cm when measured at 25° C. by the impedance analyzer.

<EXAMPLE 3>

Diallyl dimethyl ammonium-$(CF_3SO_2)_2N^-$ (76 weight part), ethyl propyl imidazolium-$(CF_3SO_2)_2N^-$, (18 weight part), dallyl-phthalate (5 weight part) and Esacure KTO46 (Lamberti s.p.a., 1 weight part) were mixed with each other to form a uniform mixture. Thus obtained mixture was applied on a polypropylene film or a base, by thickness of 0.5 mm. Then, the applied mixture was covered by a protection film formed of polypropylene, and irradiated with ultra violet light of 15 mw/cm$^2$ for 10 minutes. A gel electrolyte film thus obtained was homogenous, non-flowable, and self-sustainable when picked up by forceps. The film was cut in a disk at diameter of 1 cm; and ion conductivity of thus cut film was 4.6 mS/cm when measured at 25° C. by the impedance analyzer.

EXAMPLE 4

A reaction vessel equipped with an agitator is charged with acetonitrile (200 weight part) and then Li—$(CF_3SO_2)_2$N$^-$(17 weight part) is added and dissolved in the acetonitrile. Diallyl dimethyl ammonium-$(CF_3SO_2)_2N^-$ (45 weight part), ethyl methyl imidazolium-$(CF_3SO_2)_2N^-$, (25 weight part), triallyl isocyanurate (5 weight part) and Esacure KTO46 (Lamberti s.p.a., 1 weight part) were further admixed to form a uniform solution. From thus obtained mixture solution, the acetonitrile or solvent was removed by heating at 60° C. under vacuuming, as to form a precursor composition. Thus obtained precursor composition was applied on a polypropylene film or a base, by thickness of 0.5 mm. Then, the applied mixture was covered by a protection film formed of polypropylene, and irradiated with ultra violet light of 15 mW/cm$^2$ for 10 minutes. A gel electrolyte film thus obtained was homogenous, non-flowable, and self-sustainable when picked up by forceps. The film was cut in a disk at diameter of 1 cm; and ion conductivity of thus cut film was 8.1 mS/cm when measured at 25° C. by the impedance analyzer.

EXAMPLE 5

Diallyl dimethyl ammonium-$(NC)_2N^-$ (25 weight part), trimethyl butyl ammonium-$(NC)_2N^-$, (50 weight part), triallyl isocyanurate (24 weight part) and Perkadox 16 (Kayaku Akzo Corporation, 1 weight part) were uniformly mixed with each other. Thus obtained mixture was poured into a glass vial having a diameter of 3 cm; and, an electrode for measuring conductivity was immersed in the mixture. Then, the mixture was heated at 70° C. for 2 hours, as to obtain a gel electrolyte. Ion conductivity of the gel electrolyte was 10.5 mS/cm when measured at 25° C. by the impedance analyzer.

COMPARATIVE EXAMPLE 1

Diallyl dimethyl ammonium-$(CF_3SO_2)_2N^-$ (50 weight part), ethyl methyl imidazolium-$(CF_3SO_2)_2N^-$ (49 weight part) and Esacure KT046 (Lamberti s.p.a., 1 weight part) were mixed with each other to form a uniform mixture. Thus obtained mixture was applied on a polypropylene film or a base, by thickness of 0.5 mm. Then, the applied mixture was covered by a protection film formed of polypropylene, and irradiated with ultra violet light of 15 mW/cm² for 10 minutes. Cured product was homogeneous and non-flowable, but a paste form; thus self-sustainable gel electrolyte film was not achieved. Meanwhile, ion conductivity of the paste was 15.1 mS/cm when measured at 25° C. by the impedance analyzer.

<COMPARATIVE EXAMPLE 2>

Diallyl dimethyl ammonium-$(CF_3SO_2)_2N^-$ (4 weight part), ethylmethyl imidazolium-$(CF_3SO_2)_2N^-$ (95 weight part), triallyl isocyanurate (0.5 weight part) and Esacure KTO46 (Lamberti s.p.a., 0.5 weight part) were mixed with each other to form a uniform mixture. Thus obtained mixture was applied on a polypropylene film or a base, by thickness of 0.5 mm. Then, the applied mixture was covered by a protection film formed of polypropylene, and irradiated with ultra violet light of 15 mW/cm² for 10 minutes. Product was remained to be liquid; thus a gel electrolyte film was not achieved.

What is claimed is:

1. A precursor composition for an ion-polymer gel electrolyte comprising: (A) a polymerizable ion pair compound, (B) a cross-linker having two or more unsaturated groups co-polymerizable with the polymerizable ion pair compound (A), and (C) non-polymerizable ion pair compound, wherein the polymerizable ion pair compound (A) is a monomer represented by following general formula I,

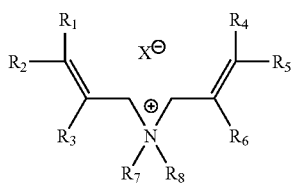

I wherein each of R1, R2, R3, R4, R5 and R6 independently represents hydrogen atom, alkyl or aryl group having 1-12 carbon atoms; and each of R7 and R8 independently represents alkyl or aryl group having 1-12 carbon atoms; X designates one selected from the group consisting of: halogen atom, $AlCl_4^-$, $PF_6^-$, $BF_4^-$, bis(oxalato) borate anion, $R_{f1}SO_3^-$, $(NC)_2N^-$, $(R_{f2}Y)_2N^-$, $(R_{f2}Y)_3C^-$ and $(R_{f2}Y)_2C^-Q$, where $R_{f1}$ designates perfluoro alkyl or aryl group having 1-8 carbon atoms, $R_{f2}$ designates independently fluorine atom, perfluoro alkyl or aryl group having 1-8 carbon atoms, Y designates $—SO_2—$ or $—PO—R_{f2}$; and Q designates $—H$ or $—CO—R_{f2}$.

2. A precursor composition according to claim 1, wherein the non-polymerizable ion pair compound (C) comprises a cation selected from the group consisting of: proton, alkaline metal ions, alkaline earth metal ions, zinc ion, cadmium ion, mercury ion, rare earth ions, diazonium ion, phosphonium ion, sulfonium ion, oxonium ion, and organic cations represented by general formula of $NuR^+$, in which Nu designates ammonia, alkyl amine, pyridine, imidazole, amidine, guanidine or alkaloid, while $R^+$ designates alkyl or oxyalkyl group having 1-20 carbon atoms or aryl group having 6-30 carbon atoms.

3. A precursor composition according to claim 1, wherein
each of R1, R2, R4 and R5 in the general formula I represents a hydrogen atom; and
each of R3 and R6 independently represents a hydrogen atom or a methyl group.

4. A precursor composition according to claim 3, wherein the polymerizable ion pair compound (A) is formed of a cation and an anion, wherein
the cation is selected from the group consisting of: diallyl dimethyl ammonium, diallyl methyl-ethyl ammonium, dimethallyl dimethyl ammonium, diallyl methyl-propyl ammonium and diallyl methyl-hexyl ammonium; and
the anion is selected from the group consisting of: $R_{f1}SO_3^-$, $(NC)_2N^-$, $(R_{f2}Y)_2N^-$, $(R_{f2}Y)_3C^-$, and $(R_{f2}Y)_2C^-Q$.

5. A precursor composition according to claim 4, wherein the anion is selected from the group consisting of: $(CF_3SO_2)_2N^-$, $(FSO_2)_2N-$ and $(NC)_2N^-$.

6. A precursor composition according to claim 3, wherein the cross-linker (B) is an ion pair compound comprising a cation and an anion or comprising a non-ionic compound, wherein
the cation is selected from the group consisting of: triallyl-methyl ammonium, triallyl-ethyl ammonium, triallyl-propyl ammonium, triallyl-butyl ammonium and triallyl-hexyl ammonium;
the anion is selected from the group consisting of: $R_{f1}SO_3^-$, $(NC)_2N^-$, $(R_{f2}Y)_2N^-$, $(R_{f2}Y)_3C^-$, and $(R_{f2}Y)_2C^-Q$; and
the non-ionic compound is selected from the group consisting of: diallyl phthalate, dial lyl terephthalate, triallyl isocyanurate and trimethylol propane triallyl ether.

7. A precursor composition according to claim 6, wherein
the cation is selected from the group consisting of: triallyl-methyl ammonium, triallyl-ethyl ammonium, triallyl-propyl ammonium, triallyl-butyl ammonium and triallyl-hexyl ammonium;
the anion is selected from the group consisting of: $(CF_3SO_2)_2 {}_N^-$, $(FSO_2)_2N^-$ and $(NC)_2N^-$; and
the non-ionic compound is selected from the group consisting of: diallyl phthalate, diallyl terephthalate, triallyl isocyanurate and trimethylol propane triallyl ether.

8. An ion-polymer gel elctrorylte formed by curing the precursor composition according to any of claims 3-7.

* * * * *